US010522306B2

(12) United States Patent
White et al.

(10) Patent No.: US 10,522,306 B2
(45) Date of Patent: Dec. 31, 2019

(54) SYSTEM AND METHOD OF CAUSING A ZERO-CURRENT CROSSING IN AN ELECTRICAL CIRCUIT

(71) Applicant: North Carolina State University, Raleigh, NC (US)

(72) Inventors: Leonard W. White, Raleigh, NC (US); Subhashish Bhattacharya, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 130 days.

(21) Appl. No.: 15/606,599

(22) Filed: May 26, 2017

(65) Prior Publication Data
US 2017/0345587 A1 Nov. 30, 2017

Related U.S. Application Data

(60) Provisional application No. 62/342,340, filed on May 27, 2016.

(51) Int. Cl.
| H01H 9/56 | (2006.01) |
| H02M 3/335 | (2006.01) |
| H01H 33/59 | (2006.01) |
| H02M 1/00 | (2006.01) |

(52) U.S. Cl.
CPC ............ *H01H 9/56* (2013.01); *H01H 33/596* (2013.01); *H02M 3/33576* (2013.01); *H02M 2001/0058* (2013.01); *Y02B 70/1491* (2013.01)

(58) Field of Classification Search
CPC .............. H01H 9/56; H02M 3/33576; H02M 2001/0058; Y02B 70/1491
See application file for complete search history.

(56) References Cited

U.S. PATENT DOCUMENTS 9,899,929 B2* 2/2018 Jitaru .................. H02M 3/3353

OTHER PUBLICATIONS

Mobarrez et al., Comparative study of DC circuit breakers using realtime simulations, IECON 2014—40th Annual Conference of the IEEE Industrial Electronics Society, Oct. 29, 2014-Nov. 1, 2014, pp. 3736-3742.

* cited by examiner

*Primary Examiner* — Jung Kim
(74) *Attorney, Agent, or Firm* — Meunier Carlin & Curfman LLC

(57) ABSTRACT

Disclosed herein are methods and systems for causing a zero-current crossing in an electrical circuit. The circuit can be a DC circuit in which case a switch is caused to open at or nearly at the zero crossing. Alternatively, the circuit can be an AC circuit.

15 Claims, 4 Drawing Sheets

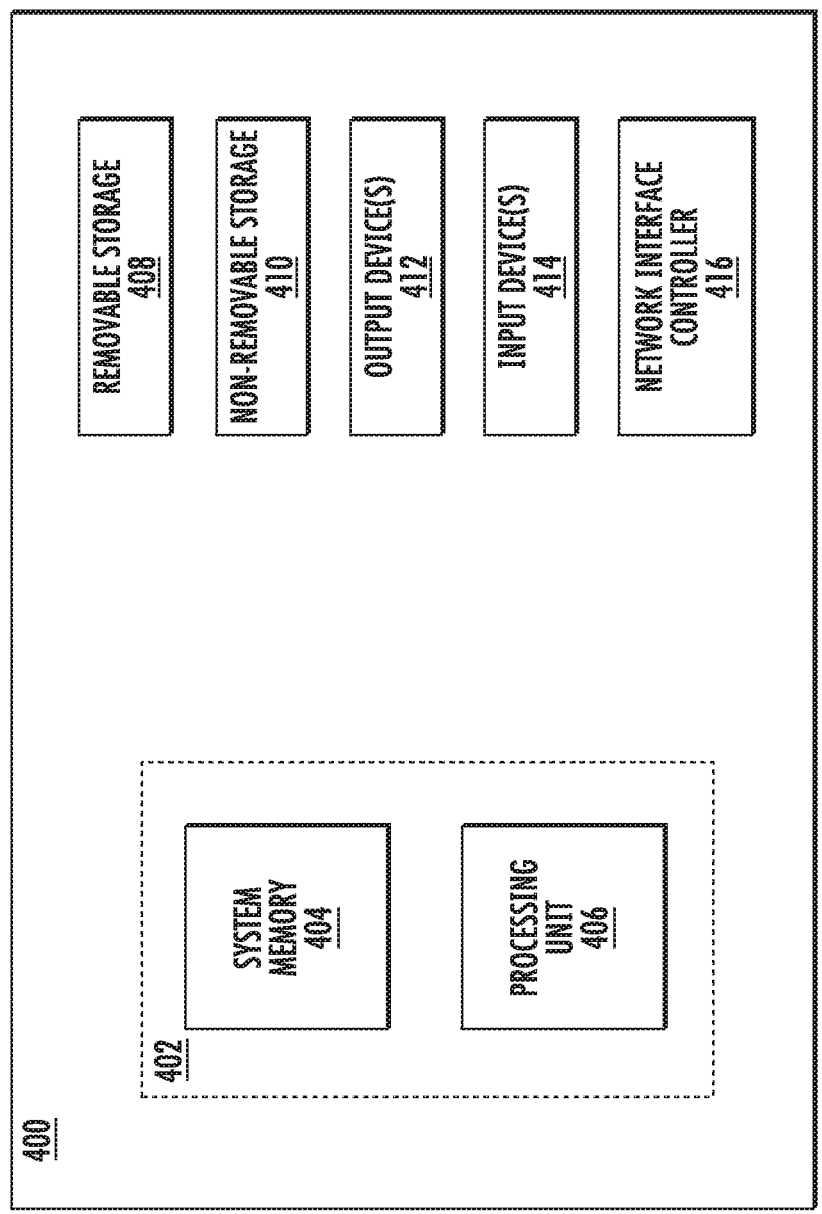

SYSTEM AND METHOD OF CAUSING A ZERO-CURRENT CROSSING IN AN ELECTRICAL CIRCUIT

CROSS REFERENCE TO RELATED APPLICATION

This application claims priority to and benefit of U.S. Provisional Patent Application Ser. No. 62/342,340 filed May 27, 2016, which is fully incorporated by reference and made a part hereof.

BACKGROUND

Traditionally, electrical Transmission and Distribution (T&D) has been accomplished using Alternating Current (AC) currents and voltages. Interruption of AC currents typically takes advantage of the periodic zero-crossing that is inherent with AC waveforms. The AC circuit breaker clears the current at or near the point where the AC current crosses the zero-current line.

Direct current (DC) power has recently become much more important in the power T&D arena. A challenge encountered with the use of DC power is that DC current, lacking the natural zero-crossing, is much more difficult to interrupt. For example, M. Mobarrez et al., "Comparative study of DC circuit breakers using realtime simulations," IECON 2014—40th Annual Conference of the IEEE Industrial Electronics Society, Oct. 29, 2014-Nov. 1, 2014, pgs. 3736-3742, which is fully incorporated by reference, provides an in-depth look at current state-of-the-art technologies for interrupting DC current and the challenges associated with present technologies.

New systems that are based on DC require a simple, effective, means for active interruption of DC currents for normal circuit switching and for the interruption of fault currents. Circuit breakers based on the technology described herein overcome challenges presently encountered in the art, some of which are described above, and provide a solution to interruption of DC that is not presently available.

SUMMARY

Because there is no natural zero crossing with DC, it is necessary to artificially generate such a crossing. Described herein are systems and methods of using an isolating transformer with a primary winding and mechanical switch in series with the DC load to create a zero-crossing. The only losses from such an arrangement are the DC resistances of the switch and of the winding itself, which are generally small. The secondary winding of the isolating transformer is connected through a switch, either solid state or mechanical, to a pre-charged capacitor. The secondary winding is electrically connected so that current through the winding opposes the current through the primary winding. A separate, high-impedance, power supply is used to maintain the voltage on the capacitor.

The device operates by causing a reverse current to flow in the primary winding when the capacitor switch is activated. With proper selection of capacitor size the current is sufficient to cause the primary current in the transformer to fall to below zero as the beginning part of a ringing transient. At the instant the current crosses the zero point, the mechanical switch is operated to interrupt the main current in the primary.

Optionally or alternatively, the device further comprises a separate sub-circuit that detects the instant when the current falls to (or near) zero and, upon detection of that condition, discharges the remaining capacitor charge into a bleeder resistor. The purpose of this circuit is to allow the capacitor charge to be maximized without regard to having to match the device to a particular load.

In one aspect, the turns-ratio of the primary to secondary can be used to advantage to reduce the voltage requirement at the secondary side. In this way a relatively low capacitor voltage can be utilized to interrupt a high level of DC voltage. Energy stored in the capacitor must be at least equal to the energy stored in the magnetic field supported by the DC current plus any saturation energy of the transformer core.

Optionally or alternatively, a third winding can be introduced into the transformer so that saturation effects can be eliminated or reduced. The DC current through this winding would arranged to oppose the current flow in the primary. This current, typically small, can be dynamically modulated to allow reduction of saturation effects over a wide range of primary current values.

Applications of embodiments of the device are very general in the power distribution world including low voltage applications in photo-voltaic (PV) generation resources, energy storage application, plus T&D applications at all voltage levels including Medium Voltage (MV), High Voltage (HV) levels, and Extreme High Voltage systems (EHV). Embodiments as disclosed herein may also be used in AC circuit applications to improve total clearing time for AC circuit breakers.

Other systems, methods, apparatus, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other, like reference numerals designate corresponding parts throughout the several views:

FIG. 4 illustrates an example computing device upon which embodiments of the invention may be implemented.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the figures and their previous and following description.

Figure 1:
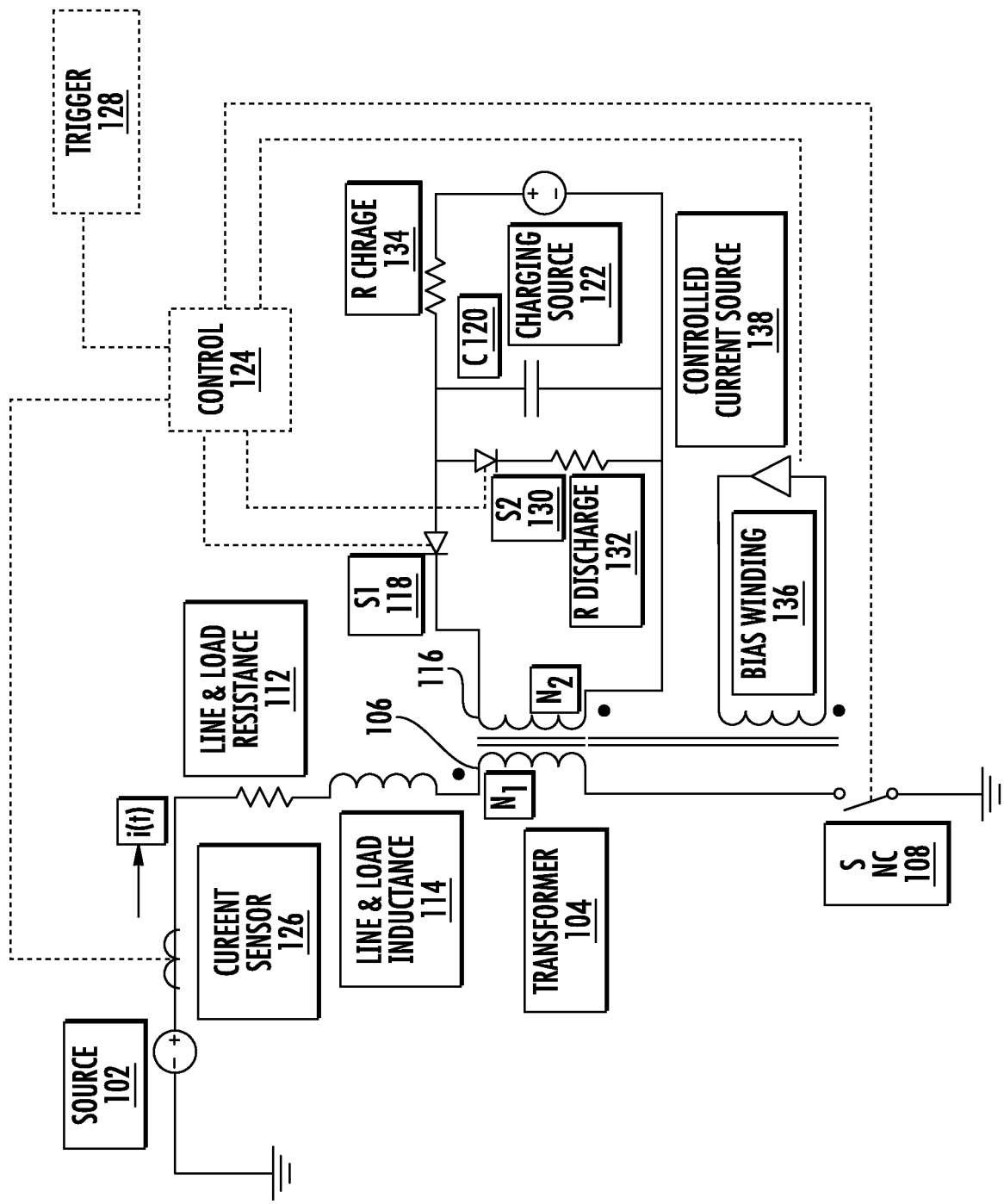
FIG. 1 illustrates an exemplary circuit according to embodiments of the disclosure.

FIG. 1 illustrates an exemplary circuit comprising a source 102 such as a DC source, an isolating transformer 104 with a primary winding 106 and a Normally Closed (NC) mechanical switch 108 in series with the load comprised of line and load resistance 112 and line and load inductance 114. The secondary winding 116 of the isolating transformer 104 is connected through a switch 118, either solid state or mechanical, to a capacitor 120. The secondary winding 116 of the isolating transformer 104 is connected so that current through the secondary winding 116 opposes the current through the primary winding 106 of the isolating transformer 104. Further comprising the circuit is a charging source 122 for charging the capacitor 120 and a control 124 for controlling operation of the circuit. Generally, the charging source 122 comprises a DC high-impedance power supply that is used to maintain the voltage on the capacitor 120; the high-impedance protects the power supply from high-current loads Initially, the source 102 is providing energy to a load. The load is represented in the diagram by the line and load resistance elements 112. For simplicity, this single element includes the DC resistance of the load itself and of lines supplying the load. As an aside, typically the line resistance is much less than the load resistance. The load and the line supplying the load also have inductive reactance. These inductive components, again for simplicity, are shown as a single value labeled line and load inductance 114. Energy stored in the magnetic fields of the inductive elements must be dissipated when the switch 108 interrupts the DC current.

The main current pathway passes through one winding (the primary winding 106) of the isolating transformer 104. This primary winding 106 of the isolating transformer 104 is sized to carry the full current and withstand the voltage of the system. This transformer winding 106 has N1 turns. Generally, N1 is a relatively small number of turns with a very low DC resistance. By having a low number of turns in the series circuit, the implication is that—unlike some other presently available solutions—the overall device will have a very low insertion loss; the electrical loss due to inserting the transformer will be close to zero. The turns ratio of the transformer, N1:N2, can be used to advantage to provide an optimal match between capacitor voltage and line voltage.

The mechanical switch, S 108, can be an isolating switch. This switch 108 is generally not intended to interrupt the main DC current, but to maintain the open-circuit once the circuitry generates a zero-crossing point. In the illustrated configuration, the switch S 108 is normally closed (NC); it can be remotely opened by the control circuitry 124.

The control circuitry 124 interfaces with the various parts of the system. Inputs and outputs of the control circuitry 124 can include an input from a current sensor 126. This is an input of measured DC current that passes through the DC circuit including the primary winding 106 of the isolating transformer 104. The control circuitry 124 can also include a trigger 128. The trigger 128 is either an internally generated signal (for an automatic current overcurrent device), or a manual signal to tell the system to initiate an interrupt sequence. Outputs of the control circuitry 124 can include an output to switch S 108, which is a signal that tells the switch 108 to open. In one aspect, this can comprise a two-way signal so that the control circuitry 124 has information about the open/closed state of the switch 108. The control circuitry 124 may also comprise an output to switch S1 118, the operation of which initiates the transfer of energy stored in the capacitor C 120 to the secondary 116 of the transformer 104.

Optionally or alternatively, the control circuitry further comprises a sub-circuit that detects the instant when the current falls to (or near) zero and, upon detection of that condition, causes switch S2 130 to close, which discharges the remaining charge on the capacitor 120 into a bleeder resistor 132. The purpose of this sub-circuit is to allow the capacitor charge to be maximized without regard to having to match the device to a particular load.

As shown in the embodiment illustrated in FIG. 1, the charging source 122 is a power supply that maintains the voltage on the capacitor 120. Optional resistor, RCharge 134, limits the current from the power supply when S1 118 and/or S2 130 are operated. In normal operation, the DC charging source 122 keeps the voltage across capacitor, C 120, at a pre-defined level.

Trip action of the circuit shown in FIG. 1 comprises activation of switch S1 118 by the control circuitry 124. Generally, this comprises closing normally open (NO) switch S1 118. Upon the closing of switch S1 118, electrical energy stored in capacitor C 120 discharges across the N2 winding of the transformer 104. The transformer 104 is electrically connected such that the resultant current in the secondary winding 116 of the transformer 104 from the capacitor discharge opposes the main current through the primary winding 106 of the transformer 104. The result is that when the device is activated by closing switch S1 118, the current through the primary winding 106 is the sum of the normal current and the induced current. The capacitor 120 is sized such that the main current through the primary winding 106 is forced to a value below zero. An artificial zero-crossing point has thus been generated.

Figure 2:
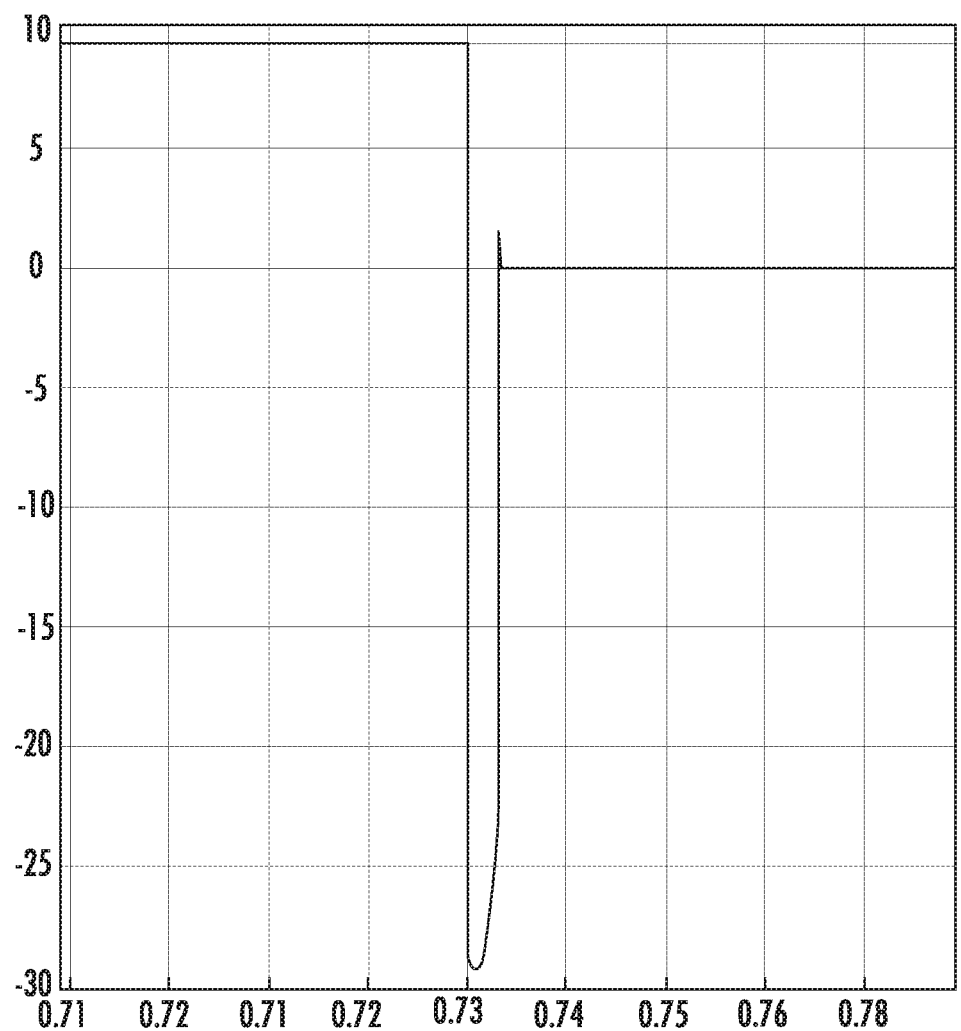
FIG. 2 illustrates results of a computer simulation of a DC current during the operation of the circuit shown in FIG. 1, it illustrates DC load current at the interruption point.

When the current sensor 126 reports to the control circuitry 124 that the main current has been reduced to or close to zero, the control circuitry 124 directs the main switch, S 108, to open. The timing will be such that the main current will be at or nearly zero in magnitude at the instant that the contacts of switch S 108 open. The only requirement for the switch 108 opening—to ensure a complete clearance of the main current—is that the distance between the contacts be far enough apart so that there is no possibility of a restrike when the transient ends. See FIG. 2 for a computer simulation of a DC current during the operation of the circuit shown in FIG. 1. In this simulation the switch S1 118 is triggered at time, t=0.75 s.

Figure 3:
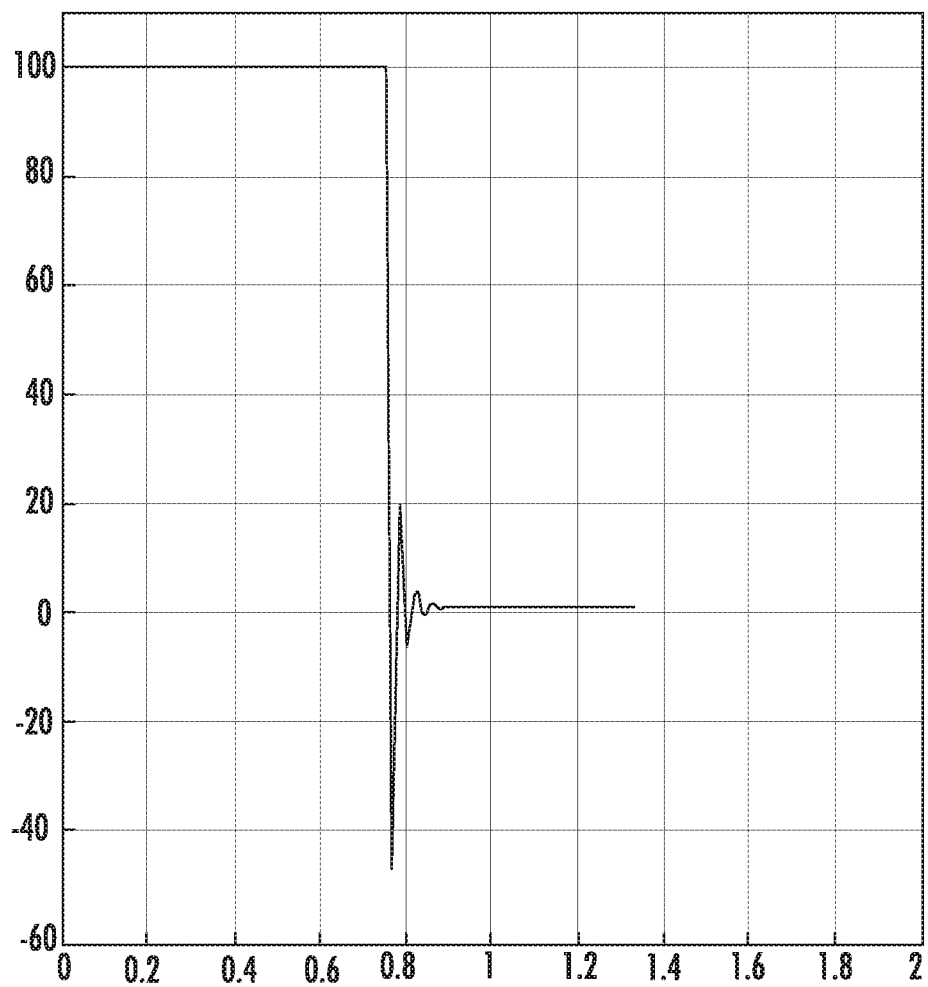
FIG. 3 illustrates a voltage transient across the load at the time of the current interruption.

There will be a voltage transient across the load at the time of the current interruption; see FIG. 3. Alternatively or optionally, the voltage transient can be suppressed by providing a Transient Voltage Surge Suppressor (TVSS) across the load to mitigate this effect. Alternatively or optionally, at the instant that the current sensor 126 reports to the control circuitry 124 that the main current has been reduced to below zero, the control circuitry directs switch S2 130 to close. This places resistor RDischarge 132 across the capacitor 120 to dissipate any un-needed energy. This can reduce the level of the voltage transient imposed across the load and will reduce the requirements for the TVSS. The addition of energy dissipation circuitry allows the capacitor 120 to be sized as large as possible to maximize the amount of current that can be interrupted while minimizing the transient voltage across the load.

The disclosed system as shown in FIG. 1 can be reset to the initial condition by opening switches S1 118 and S2 130 and closing switch S 108. This may be accomplished, for example, by a negation of the trigger command 128.

Optionally, the circuit may include a bias winding 136, as shown in FIG. 1. The bias winding 136 may reduce the amount of energy storage required of the capacitor 120. If a bias winding 136 is added to the transformer 104, it will be possible to nullify the saturation of the transformer 104 by driving the bias winding 136 with a current in the opposite direction to the current flow in the main winding 106 of the transformer 104. This enhancement reduces the energy storage requirement of the capacitor, C 120, by the amount of the saturation energy.

The effect of the bias current can be made dynamic, that is, responsive to the actual main current by adding a controlled current source 138 driven by the control circuitry. Using this approach the degree of saturation of the transformer 104 core can be minimized for any particular level of main path current.

As noted above, while primarily described in relation to a DC circuit, it is to be appreciated that embodiments of the zero-crossing circuitry are applicable in either DC circuits and/or AC circuits and both are contemplated within the scope of this invention.

The control circuitry 124 described above may comprise a computer. When the logical operations described herein are implemented in software, the process or portions of the process may execute on the computer of the control circuitry 124. Such a computing device 400 as shown in FIG. 4 can be used. For example, referring to FIG. 4, an example computing device 400 upon which embodiments of the invention may be implemented is illustrated. The computing device 400 can optionally be a mobile computing device such as a laptop computer, a tablet computer, a mobile phone and the like. The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, or any other non-transitory medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The techniques described herein may optionally be implemented with a mobile computing device, such as a laptop computer, tablet computer or mobile phone. Accordingly, the mobile computing device is extremely small compared to conventional devices and is very portable, which allows the mobile computing device to be used wherever needed.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of causing a zero-current crossing in an electrical circuit comprising:
   providing a transformer having a primary and a secondary winding, the primary winding is connected in series with a source and a load and a first switch that operates in a normally closed position, wherein it is desired to create a zero-crossing in a main current that flows through the primary winding;
   providing a capacitor connected in parallel to the secondary winding with a second switch between the capacitor and the secondary winding, said second switch operating in a normally open position and said capacitor electrically connected with the secondary winding such that when said second switch is closed a secondary current flows in the secondary winding in a direction that is opposite to a direction of the main current flow;
   closing the second switch allowing the secondary current to flow through the secondary winding in the direction that is opposite the direction that the main current flows through the primary winding, wherein said secondary current causes the main current to go to a magnitude of zero, less than zero, or nearly zero,
   providing a control circuit, wherein said control circuit monitors at least a magnitude of the main current and controls operation of the first switch and the second switch;
   closing, by the control circuit, the second switch allowing the secondary current to flow through the secondary winding in the direction that is opposite the direction that the main current flows through the primary winding; and
   opening, by the control circuit, the first switch when the monitored magnitude of the main current is at or nearly at zero.

2. The method of claim 1, wherein the main current comprises an alternating current (AC).

3. The method of claim 1, wherein the main current comprises a direct current (DC).

4. The method of claim 1, wherein the control circuit detects when the main current falls to or below zero and, upon detection of that condition, closes a third switch that discharges any remaining energy in the capacitor charge into a bleeder resistor.

5. The method of claim 1, wherein a turns-ratio of the transformer can be used to reduce a voltage requirement at the secondary winding of the transformer.

6. The method of claim 1, wherein energy stored in the capacitor is at least equal to energy stored in a magnetic field supported by the main current plus any saturation energy of a core of the transformer.

7. The method of claim 1, further comprising a third winding of the transformer, wherein the third winding is driven with a current in an opposite direction to the current flow in the primary winding of the transformer such energy stored in the capacitor can be reduced.

8. The method of claim 1, wherein the method is applied to low voltage applications in photo-voltaic (PV) generation resources, energy storage application, transmission and distribution (T&D) applications at all voltage levels including Medium Voltage (MV), High Voltage (HV) levels, and Extreme High Voltage systems (EHV) and in AC circuit applications to improve total clearing time for AC circuit breakers.

9. A direct-current (DC) circuit breaker system comprising:
   a transformer having a primary and a secondary winding, the primary winding connected in series with a source and a load and a first switch that operates in a normally closed position, wherein it is desired to create a zero-crossing in a main current that flows through the primary winding;
   a capacitor connected in parallel to the secondary winding with a second switch between the capacitor and the secondary winding, said second switch operating in a normally open position and said capacitor electrically connected with the secondary winding such that when said second switch is closed a secondary current flows in the secondary winding in a direction that is opposite to a direction of the main current flow;
   a control circuit, wherein said control circuit monitors at least a magnitude of the main current and controls operation of the first switch and the second switch, wherein said control circuit:
   closes the second switch allowing the secondary current to flow through the secondary winding in the direction that is opposite the direction that the main current flows through the primary winding, wherein said secondary current causes the main current to go to a magnitude of zero, less than zero, or nearly zero; and open, by the control circuit, the first switch when the monitored magnitude of the main current is at or nearly at zero.

10. The system of claim 9, wherein the control circuit detects when the main current falls to or below zero and, upon detection of that condition, closes a third switch that discharges any remaining energy in the capacitor charge into a bleeder resistor.

11. The system of claim 9, wherein a turns-ratio of the transformer can be used to reduce a voltage requirement at the secondary winding of the transformer.

12. The system of claim 9, wherein energy stored in the capacitor is at least equal to energy stored in a magnetic field supported by the main current plus any saturation energy of a core of the transformer.

13. The system of claim 9, further comprising a third winding of the transformer, wherein the third winding is driven with a current in an opposite direction to the current flow in the primary winding of the transformer such energy stored in the capacitor can be reduced.

14. The system of claim 9, wherein the method is applied to low voltage applications in photo-voltaic (PV) generation resources, energy storage application, transmission and distribution (T&D) applications at all voltage levels including Medium Voltage (MV), High Voltage (HV) levels, and Extreme High Voltage systems (EHV) and in AC circuit applications to improve total clearing time for AC circuit breakers.

15. The system of claim 9, wherein the control circuit includes a computing device.

* * * * *